US012675200B2

(12) United States Patent  (10) Patent No.:  US 12,675,200 B2
Noguchi  (45) Date of Patent:  Jul. 7, 2026

(54) POSITION DETECTING DEVICE, ELECTROMAGNETIC RESONANCE STYLUS, AND POSITION DETECTING SYSTEM

(71) Applicant: Wacom Co., Ltd., Saitama (JP)

(72) Inventor: Koji Noguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/965,833

(22) Filed: Dec. 2, 2024

(65) Prior Publication Data

US 2025/0173034 A1    May 29, 2025

Related U.S. Application Data

(63) Continuation of application No. PCT/JP2023/018889, filed on May 22, 2023.

(30) Foreign Application Priority Data

Jun. 10, 2022    (JP) ................................. 2022-094664

(51) Int. Cl.
*G06F 3/046*        (2006.01)
*G06F 3/0354*       (2013.01)
*G06F 3/041*        (2006.01)

(52) U.S. Cl.
CPC .......... *G06F 3/046* (2013.01); *G06F 3/03545* (2013.01); *G06F 3/041661* (2019.05)

(58) Field of Classification Search
CPC . G06F 3/046; G06F 3/041661; G06F 3/03545
See application file for complete search history.

(56) References Cited

U.S. PATENT DOCUMENTS

2019/0187823 A1*  6/2019  Kake ...................... G06V 40/37
2022/0004266 A1*  1/2022  Ito ........................... G06N 20/00

FOREIGN PATENT DOCUMENTS

JP        H0519164   B2   3/1993
JP        H07129305  A    5/1995
JP        2022012385 A    1/2022
WO    WO 2018043061 A1   3/2018
WO    WO 2019159456 A1   8/2019

OTHER PUBLICATIONS

International Search Report, dated Aug. 1, 2023, for International Application 1 PCTJP2023018889. (2 pages) (English translation).

* cited by examiner

*Primary Examiner* — Lisa S Landis
(74) *Attorney, Agent, or Firm* — Seed Intellectual Property Law Group LLP

(57)        ABSTRACT

To be able to transmit data from an electromagnetic resonance stylus to a position detecting device while the position detecting device is energizing its loop coils. An electromagnetic resonance stylus according to the present disclosure includes a resonant circuit including a coil and a capacitor, a switch element connected parallel to the capacitor, and a processing circuit for transmitting data to a position detecting device by performing on/off control on the switch element based on the data to be transmitted to the position detecting device.

6 Claims, 11 Drawing Sheets

F I G . 2
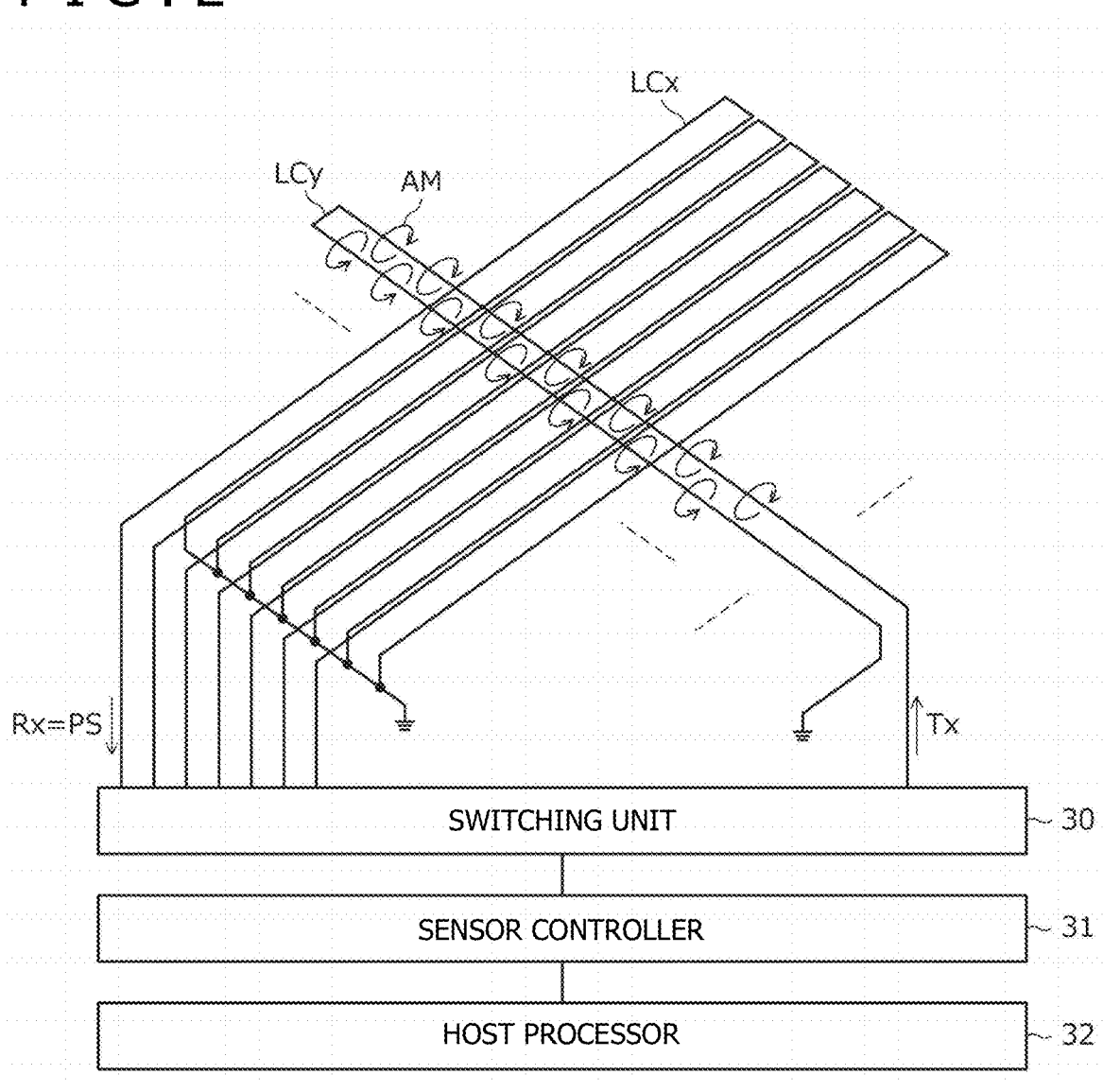

F I G . 3
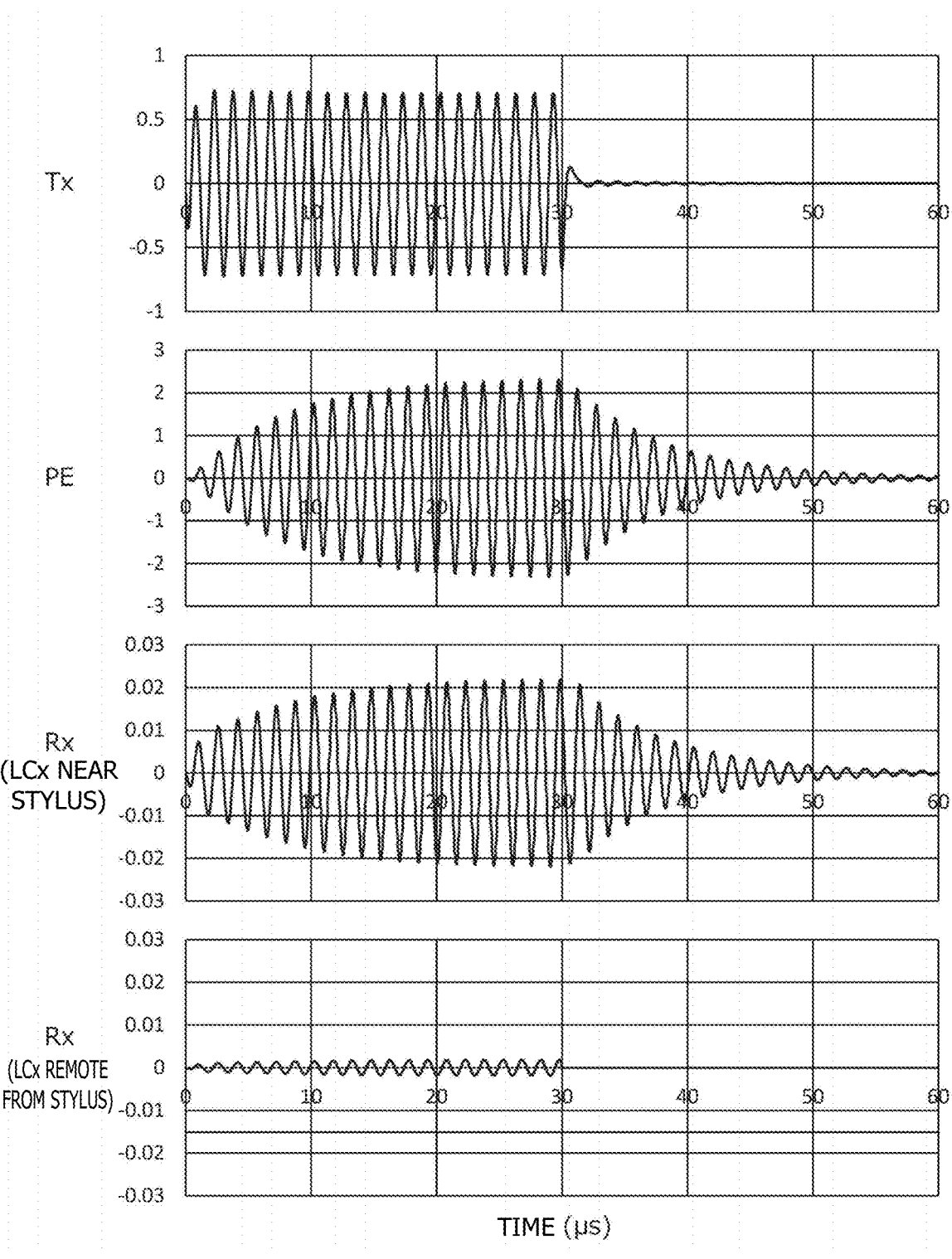
TIME (µs)

TIME (μs)

TIME(μs)

POSITION DETECTING DEVICE, ELECTROMAGNETIC RESONANCE STYLUS, AND POSITION DETECTING SYSTEM

BACKGROUND

Technical Field

The present disclosure relates to a position detecting device, an electromagnetic resonance stylus, and a position detecting system.

Description of the Related Art

There has been known a position detecting device for detecting the position of an electromagnetic resonance stylus on the basis of the electromagnetic resonance (EMR) principle. Patent Document 1 discloses an example of a position detecting device of the type described. The position detecting device described in the document has a plurality of X-side loop coils arrayed along an X-axis and a Y-side loop coils arrayed along a Y-axis, and is configured to detect induced currents developed in the respective Y-side loop coils and energize the X-side loop coils successively one by one (supply predetermined drive currents to the X-side loop coils). An electromagnetic resonance stylus described in the document incorporates therein a resonant circuit including a coil and a capacitor.

When the position detecting device energizes a certain X-side loop coil, it detects a significant induced current from a Y-side loop coil that crosses the X-side loop coil at a point in the vicinity of which the electromagnetic resonance stylus is present. The position detecting device described in Patent Document 1 derives the coordinates of the electromagnetic resonance stylus on the basis of the nature of such an induced current.

Prior Art Document

Patent Document

Patent Document 1: Japanese Patent Laid-Open No. H05-019164

BRIEF SUMMARY

Technical Problems

However, the technology disclosed in Patent Document 1 is problematic in that the electromagnetic resonance stylus is unable to transmit data to the position detecting device.

With regard to this point, providing there is established a period in which the position detecting device does not energize the X-side loop coils, it is possible for the electromagnetic resonance stylus to transmit data to the position detecting device during the period. Specifically, when the position detecting device supplies the X-side loop coils with drive currents, an alternating magnetic field generated on a touch surface thereof charges the capacitor of the resonant circuit in the electromagnetic resonance stylus. Thereafter, when the position detecting device stops supplying the X-side loop coils with the drive currents, the coil of the resonant circuit in the electromagnetic resonance stylus transmits a reflected signal according to the electric power stored in the capacitor. At this time, the electromagnetic resonance stylus can change the frequency of the reflected signal to be transmitted by controlling the resonant frequency of the resonant circuit on the basis of data to be transmitted. The position detecting device can acquire the data transmitted from the electromagnetic resonance stylus by detecting an induced current flowing through an X-side loop coil or a Y-side loop coil as a reflected signal and detecting a change in the frequency of the reflected signal.

The transmission of the data according to the controlling of the frequency of the reflected signal is disabled while the position detecting device is energizing the X-side loop coils. For while the position detecting device is energizing the X-side loop coils, the frequency of the reflected signal is forcibly brought into agreement with the frequency of the drive currents.

Although the electromagnetic resonance stylus can transmit data to the position detecting device during a period in which the position detecting device does not energize the X-side loop coils, the period in which the position detecting device does not energize the X-side loop coils means a reduction in the rate of positional detection. Consequently, there have been demands for an electromagnetic resonance stylus that is able to transmit data to a position detecting device while the position detecting device is energizing its X-side loop coils.

Embodiments of the objects of the present disclosure provide a position detecting device, an electromagnetic resonance stylus, and a position detecting system that are cable of transmitting data from the electromagnetic resonance stylus to the position detecting device while the position detecting device is energizing its loop coils.

Technical Solution

A position detecting device according to the present disclosure includes a plurality of first loop coils arrayed in a first direction, a plurality of second loop coils arrayed in a second direction perpendicular to the first direction, and a sensor controller which, in operation, detects induced currents respectively in the second loop coils while energizing one of the first loop coils, in which the sensor controller, in operation, derives a position of an electromagnetic resonance stylus in at least the second direction based on a distribution of levels of the induced currents detected and acquires data transmitted by the electromagnetic resonance stylus by performing on-off keying modulation on the induced currents detected.

An electromagnetic resonance stylus according to the present disclosure includes a resonant circuit including a coil and a capacitor, a switch element connected parallel to the capacitor, and a processing circuit which, in operation, transmits data to a position detecting circuit by performing on/off control on the switch element according to the data to be transmitted to the position detecting circuit, in which the processing circuit, in operation, detects an alternating current generated in the resonant circuit by an alternating magnetic field intermittently transmitted by the position detecting circuit, and detects a timing for the position detecting device to newly transmit the alternating magnetic field based on a result of the detection of the alternating current, and performs the on/off control on the switch element based on the timing detected.

A position detecting system includes an electromagnetic resonance stylus and a position detecting device, in which the electromagnetic resonance stylus includes a resonant circuit including a coil and a capacitor, a switch element connected parallel to the capacitor, and a processing circuit which, in operation, transmits data to the position detecting circuit by performing on/off control on the switch element according to the data to be transmitted to the position detecting circuit. The position detecting device includes a plurality of first loop coils arrayed in a first direction, a plurality of second loop coils arrayed in a second direction perpendicular to the first direction, and a sensor controller which, in operation, detects induced currents respectively in the second loop coils while energizing one of the first loop coils, and the sensor controller, in operation, derives the position of the electromagnetic resonance stylus in at least the second direction based on a distribution of levels of the induced currents detected and acquires data transmitted by the electromagnetic resonance stylus by performing on-off keying modulation on the induced currents detected.

Advantageous Effect

According to the present disclosure, it is possible for the electromagnetic resonance stylus to transmit data to the position detecting device while the position detecting device is energizing the loop coils by causing the electromagnetic resonance stylus to switch between a state where the resonant circuit exists and a state where no resonant circuit exists.

BRIEF DESCRIPTION OF THE SEVERAL VIEWS OF THE DRAWINGS

FIG. 2 is a diagram that is explanatory of the relation between transmission of an alternating magnetic field AM and the reception of a stylus signal PS.

FIG. 3 is a diagram illustrating results of a simulation of waveforms of a drive current Tx, an electromotive force PE, and induced currents Rx.

DETAILED DESCRIPTION

Embodiments of the present disclosure will be described in detail below with reference to the accompanying drawings.

Figure 1:
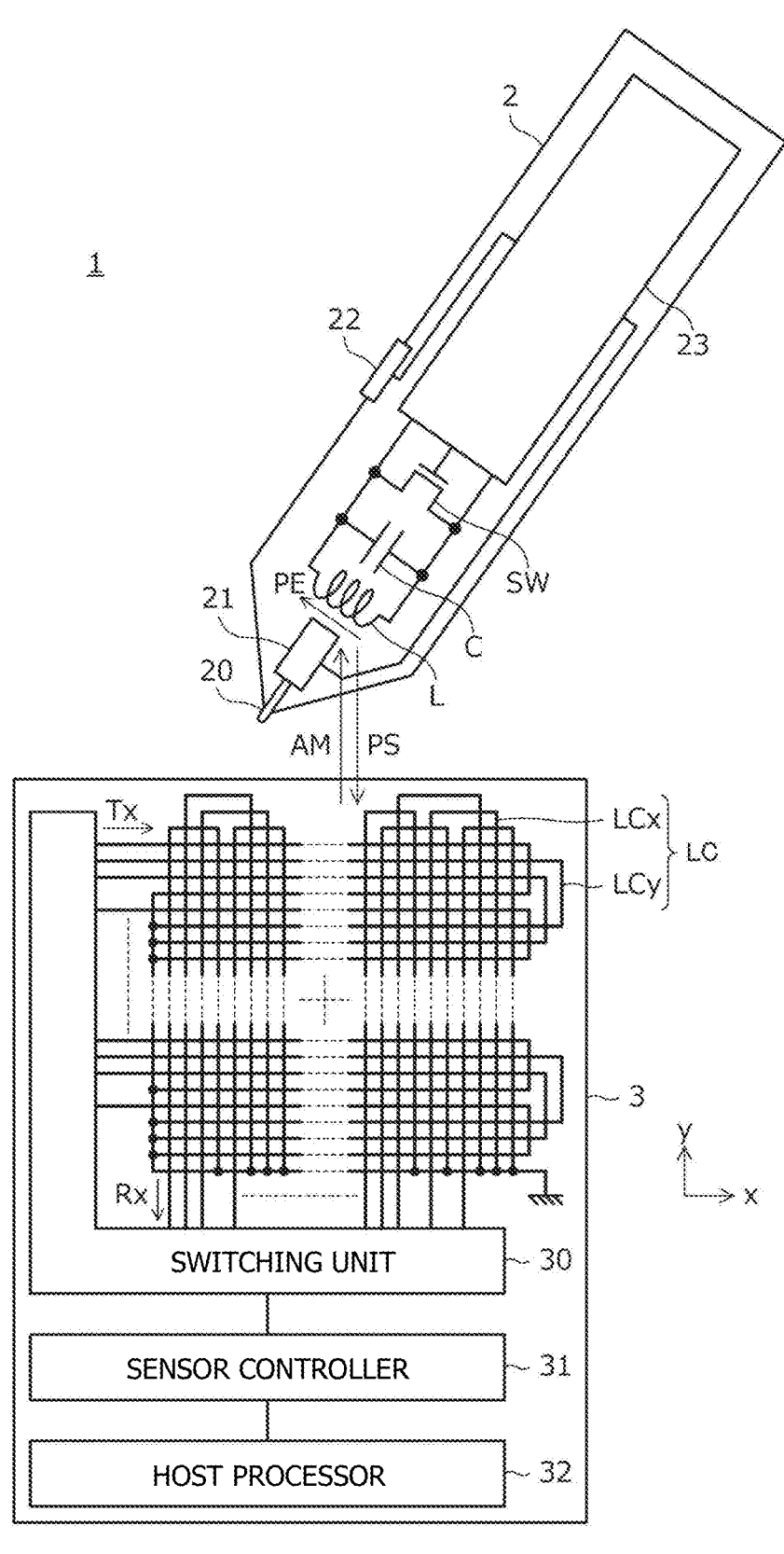
FIG. 1 is a diagram illustrating a configuration of a position detecting system 1 according to a first embodiment of the present disclosure.

FIG. 1 is a diagram illustrating a configuration of a position detecting system 1 according to a first embodiment of the present disclosure. As illustrated in FIG. 1, the position detecting system 1 has an electromagnetic resonance stylus 2 and a position detecting device 3 each compatible with the EMR principle. The electromagnetic resonance stylus 2 includes a pen-shaped device including a core 20, a pressure sensor 21, a side switch 22, a processing circuit 23, a coil L, a capacitor C, and a switch element SW. The position detecting device 3 includes a device including a plurality of loop coils LC, a switching unit 30, a sensor controller 31, and a host processor 32. The loop coils LC include a plurality of loop coils LCx (second loop coils) arrayed in an x direction (second direction) and a plurality of loop coils LCy (first loop coils) arrayed in a y direction (first direction) perpendicular to the x direction. According to a typical example, the position detecting device 3 includes a tablet or a laptop computer having a display surface doubling as a touch surface. However, the position detecting device 3 may be implemented by a digitizer free of a display surface.

Before the configurations of the electromagnetic resonance stylus 2 and the position detecting device 3 are described in detail, the present disclosure will be summarized below. The sensor controller 31 has a function to transmit an alternating magnetic field AM intermittently through the loop coils LCy from the touch surface of the position detecting device 3. When the coil L of the electromagnetic resonance stylus 2 enters the alternating magnetic field AM, an electromotive force PE is generated across the coil L, and a stylus signal PS is transmitted as a reflected signal from the coil L. While transmitting the alternating magnetic field AM, the position detecting device 3 detects the position of the electromagnetic resonance stylus 2 by having the loop coils LCx detect the stylus signal PS.

While transmitting the stylus signal PS, the processing circuit 23 of the electromagnetic resonance stylus 2 turns on and off the switch element SW on the basis of data to be transmitted to the position detecting device 3, thereby performing on-off keying modulation on the stylus signal PS. The reason that the switch element SW can perform on-off keying modulation on the stylus signal PS by being turned on and off will be described in detail later. When the processing circuit 23 performs on-off keying modulation and the position detecting device 3 demodulates the stylus signal PS, the transmission of data from the electromagnetic resonance stylus 2 to the position detecting device 3 is realized while the sensor controller 31 transmits the alternating magnetic field AM. The respective configurations of the electromagnetic resonance stylus 2 and the position detecting device 3 for realizing such data transmission will be described in detail below.

First, the position detecting device 3 will be focused upon. The loop coils LC are disposed in the touch surface and include the loop coils LCx and LCy referred to above. Each of the loop coils LC has an end connected to the switching unit 30 and another end connected to ground. The switching unit 30 refers to a circuit for connecting one or more of the loop coils LC to the sensor controller 31 under the control of the sensor controller 31.

The sensor controller 31 refers to an integrated circuit having a function to detect the position of the electromagnetic resonance stylus 2 in the touch surface, acquire data transmitted from the electromagnetic resonance stylus 2 as the stylus signal PS, and supply the detected position and the supplied data sequentially to the host processor 32. To carry out these processing activities, the sensor controller 31 is configured to energize the loop coils LCy successively (i.e., to supply drive currents Tx successively to the respective loop coils LCy) and to receive induced currents Rx developed in the loop coils LCx as the stylus signal PS.

FIG. 2 is a diagram that is explanatory of the relation between the transmission of the alternating magnetic field AM and the reception of the stylus signal PS. As illustrated in FIG. 2, when the sensor controller 31 supplies one of the loop coils LCy with a drive current Tx, it generates an alternating magnetic field AM around the loop coil LCy. Since the generated alternating magnetic field AM is oriented parallel to the loop coils LCx, as seen from FIG. 2, the alternating magnetic field AM alone almost fails to cause the loop coils LCx to produce induced currents Rx. However, if the electromagnetic resonance stylus 2 is positioned in the vicinity of a point where the loop coil LCy supplied with the drive current Tx crosses a certain loop coil LCx, then inasmuch as the resonant circuit of the electromagnetic resonance stylus 2 disturbs the magnetic field, a significant induced current Rx flows through the loop coil LCx. The sensor controller 31 is configured to detect the induced current Rx thus flowing through the loop coil LCx as a stylus signal PS.

FIG. 3 is a diagram illustrating results of a simulation of waveforms of a drive current Tx, an electromotive force PE, and induced currents Rx. The illustrated induced currents Rx include an induced current Rx flowing through a loop coil LCx that is positioned in the vicinity of the electromagnetic resonance stylus 2 and an induced current Rx flowing through a loop coil LCx that is positioned remotely from the electromagnetic resonance stylus 2. The vertical axis of FIG. 3 represents the amplitudes of the waveforms, and the horizontal axis thereof represents time (μs). FIG. 3 depicts an example in which the sensor controller 31 starts to energize a certain loop coil LCy at the time of 0 μs.

As illustrated in FIG. 3, when the sensor controller 31 starts to supply a drive current Tx, an electromotive force PE is generated in the electromagnetic resonance stylus 2, causing a large induced current Rx to be observed in the loop coil LCx positioned in the vicinity of the electromagnetic resonance stylus 2. On the other hand, only a slight induced current Rx is observed in the loop coil LCx positioned remotely from the electromagnetic resonance stylus 2. The slight induced current Rx is directly induced by the alternating magnetic field AM transmitted from the loop coil LCx and will be referred to as "base noise" hereinbelow. Base noise is also included in the induced current Rx observed in the loop coil LCx positioned in the vicinity of the electromagnetic resonance stylus 2.

Thus, the position detecting system 1 sees a notable difference developed between the amplitudes of the induced currents RX in the loop coil LCx positioned in the vicinity of the electromagnetic resonance stylus 2 and the loop coil LCx positioned remotely from the electromagnetic resonance stylus 2. The sensor controller 31 derives the position of the electromagnetic resonance stylus 2 while the loop coil LCy is being energized on the basis of the difference.

Figure 4:
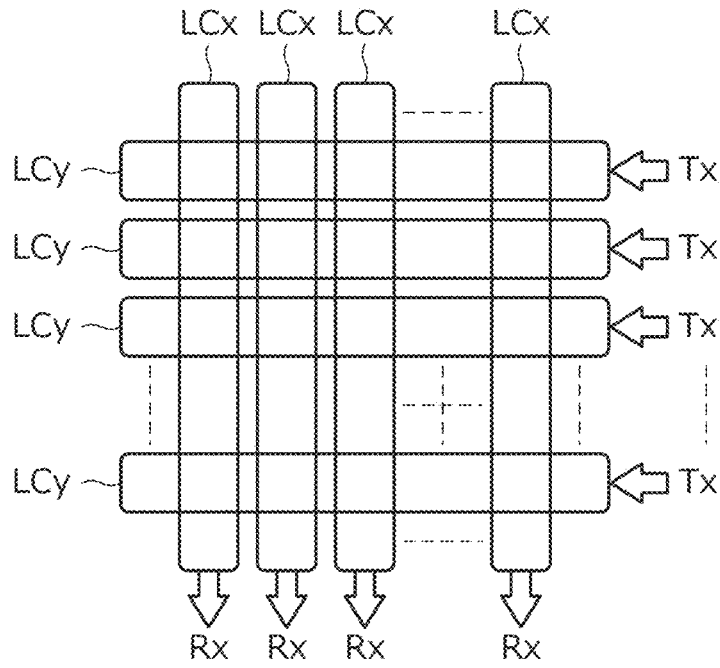
FIG. 4 is a diagram that is explanatory of a process of deriving a position by a sensor controller 31.

FIG. 4 is a diagram that is explanatory of a process of deriving a position by the sensor controller 31. The process of deriving the position of the electromagnetic resonance stylus 2 by the sensor controller 31 while the loop coil LCy is being energized will specifically be described below with reference to FIG. 4.

First, the sensor controller 31 that has not yet detected the electromagnetic resonance stylus 2 performs a global scan for newly detecting the electromagnetic resonance stylus 2. Specifically, the sensor controller 31 performs a process of supplying one of the loop coils LCy of the position detecting device 3 with a drive current Tx and detecting induced currents Rx (stylus signals PS) respectively in the loop coils LCx of the position detecting device 3, successively with respect to each of the loop coils LCy. Then, the sensor controller 31 derives the positions of the electromagnetic resonance stylus 2 respectively in the x direction and the y direction on the basis of a distribution in the touch surface of the levels of the induced currents Rx detected in the process.

Once the sensor controller 31 has detected the position of the electromagnetic resonance stylus 2 according to the global scan, the sensor controller 31 performs a local scan for updating the position of the electromagnetic resonance stylus 2. Specifically, the sensor controller 31 first selects predetermined numbers of loop coils LCx and LCy according to the latest detected position. The sensor controller 31 should preferably select predetermined numbers of loop coils LCx and LCy successively closer to the latest detected position. The sensor controller 31 then performs a process similar to the global scan by use of only the selected loop coils LCx and LCy.

Specifically, the sensor controller 31 performs a process of supplying one of the selected predetermined number of loop coils LCy with a drive current Tx and detecting induced currents Rx (stylus signals PS) respectively in the selected predetermined number of loop coils LCx, successively with respect to each of the selected predetermined number of loop coils LCy. Then, the sensor controller 31 newly derives the positions of the electromagnetic resonance stylus 2 respectively in the x direction and the y direction on the basis of a distribution in the touch surface of the levels of the induced currents Rx detected in the process, and updates the detected position with the derived position.

When performing the above local scan, the sensor controller 31 also performs a process of acquiring the data transmitted by the electromagnetic resonance stylus 2. Since the electromagnetic resonance stylus 2 performs on-off keying modulation on the stylus signal PS as described above, the induced currents Rx detected by the sensor controller 31 are also on-off keyed. The sensor controller 31 acquires the data transmitted by the electromagnetic resonance stylus 2 by demodulating the on-off keyed induced currents Rx according to on-off keying modulation.

The sensor controller 31 is configured to provide a period having a predetermined duration in which it does not supply any loop coils LCy with drive currents Tx before starting to supply the loop coils LCy with drive currents Tx. Consequently, the alternating magnetic field AM generated by the position detecting device 3 is intermittently transmitted from the touch surface. The predetermined duration referred to above is not long enough to allow data to be transmitted by controlling the frequency of reflected signals, but may be extremely short enough for the electromagnetic resonance stylus 2 to be able to detect a pause in the alternating magnetic field AM.

The electromagnetic resonance stylus 2 detects the timing for the sensor controller 31 to start newly transmitting the alternating magnetic field AM by detecting a pause in the alternating magnetic field AM that is caused by intermittently transmitting the alternating magnetic field AM, and performs on-off keying modulation on the stylus signal PS on the basis of the detected timing. The sensor controller 31 also demodulates the stylus signal PS on the basis of the timing to start transmitting the alternating magnetic field AM (i.e., the timing to start energizing any one of the loop coils LCy). In this manner, it is possible to transmit data from the electromagnetic resonance stylus 2 to the sensor controller 31 while they are in synchronism.

Referring back to FIG. 1, the host processor 32 performs a process of moving a cursor displayed on the display surface and generating stroke data indicative of a track followed by the electromagnetic resonance stylus 2 on the touch surface, using positions and data supplied from the sensor controller 31. With regard to the stroke data, the host processor 32 also performs a process of rendering and displaying the generated stroke data, a process of generating and recording digital ink including the generated stroke data, and a process of sending the generated digital ink to an external device according to user's instructions.

Now, the electromagnetic resonance stylus 2 will be focused upon. The core 20 includes a rod-shaped member making up a stylus tip of the electromagnetic resonance stylus 2, and is movable in the axial directions of the stylus. The core 20 has a rear end held in abutment against the pressure sensor 21. The pressure sensor 21 refers to a sensor for detecting a pressure applied to the stylus tip by detecting a pressing force from the rear end of the core 20, and is configured to supply the processing circuit 23 with a value (stylus pressure value) representing the detected pressure.

The side switch 22 includes an on/off switch mounted on a surface of the electromagnetic resonance stylus 2, and is configured to supply the processing circuit 23 with information (on/off information) representing its own on or off state. While the electromagnetic resonance stylus 2 is illustrated as having one side switch 22 in FIG. 1, the electromagnetic resonance stylus 2 may have a plurality of side switches 22. The electromagnetic resonance stylus 2 may have a similar switch on a surface (e.g., a terminal end portion) other than a side surface of the electromagnetic resonance stylus 2.

The coil L refers to an inductor disposed in the vicinity of the stylus tip and magnetically coupled to the loop coils LC in the position detecting device 3. The coil L is connected in parallel with the capacitor C, and makes up a resonant circuit together in cooperation with the capacitor C. When the coil L enters the alternating magnetic field AM generated by the position detecting device 3, the electromotive force PE is developed across the coil L by way of electromagnetic induction, generating an alternating current in the resonant circuit and storing electric energy in the capacitor C. At this time, induced currents Rx (stylus signal PS) are developed as a reflected signal in the loop coils LC in the position detecting device 3, and are detected by the sensor controller 31.

The switch element SW includes a single-pole single-throw switch connected in parallel with the capacitor C. When the switch element SW is off, the coil L and the capacitor C function as a resonant circuit, and when the switch element SW is on, the coil L and the capacitor C do not function as a resonant circuit because the capacitor C is short-circuited. When the coil L and the capacitor C do not function as a resonant circuit, as the magnetic field disturbance described above with reference to FIG. 2 does not occur, induced currents Rx that would otherwise be caused by a resonant circuit do not flow in the loop coils LCx in the position detecting device 3. In other words, when the switch element SW is on, no stylus signal PS is transmitted from the electromagnetic resonance stylus 2 to the position detecting device 3.

The processing circuit 23 includes an integrated circuit for transmitting data to the position detecting device 3 by performing on/off control on the switch element SW on the basis of data to be transmitted to the position detecting device 3. An example of the data to be transmitted is a stylus ID uniquely assigned to the electromagnetic resonance stylus 2 as well as the stylus pressure value and the on/off information referred to above.

According to an example, for transmitting data "0," the processing circuit 23 may control the switch element SW to be turned on to cause the amplitude of the stylus signal PS to be of a minimum value (low), and for transmitting data "1," the processing circuit 23 may control the switch element SW to be turned off to cause the amplitude of the stylus signal PS to be of a maximum value (high). This is nothing but performing on/off keying modulation on the stylus signal PS by performing on/off control on the switch element SW. When the processing circuit 23 carries out such a process, the position detecting device 3 demodulates the received stylus signal PS according to on/off control, thereby making it possible to acquire the data transmitted by the electromagnetic resonance stylus 2.

Figure 5:
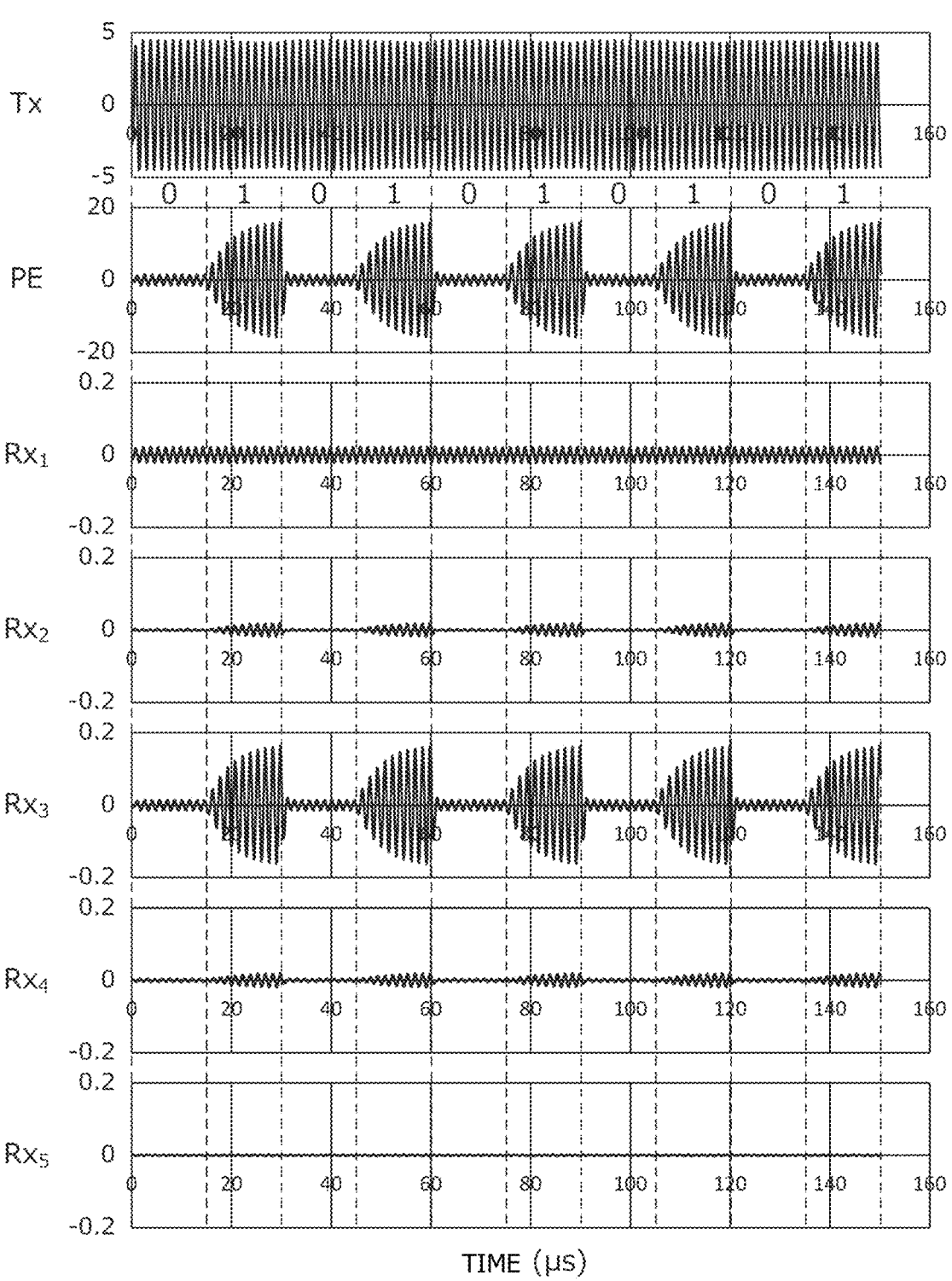
FIG. 5 is a diagram illustrating results of a simulation of the waveforms of a drive current Tx, an electromotive force PE, and induced currents Rx in a case in which an electromagnetic resonance stylus 2 performs on-off keying modulation on the stylus signal PS.

FIG. 5 is a diagram illustrating results of a simulation of the waveforms of a drive current Tx, an electromotive force PE, and induced currents Rx in a case in which the electromagnetic resonance stylus 2 performs on-off keying modulation on the stylus signal PS. The symbol $Rx_n$ denoting an induced current in FIG. 5 represents an induced current Rx observed in an nth one (which may be indicated as "loop coil $LCx_n$") of the loop coils LCx from an end in the x direction. FIG. 5 illustrates the waveforms at the time when the coil L of the electromagnetic resonance stylus 2 is positioned above a loop coil $LCx_3$.

In FIG. 5, a state where the amplitude of the electromotive force PE is relatively small corresponds to a state where the processing circuit 23 turns on the switch element SW in order to transmit data "0." A state where the amplitude of the electromotive force PE is relatively large corresponds to a state where the processing circuit 23 turns off the switch element SW in order to transmit data "1." When the processing circuit 23 thus turns on and off the switch element SW, the amplitude of the electromotive force PE undergoes large changes, which are reflected in an induced current Rx developed in a loop coil LCx. In the example illustrated in FIG. 5, since the coil L of the electromagnetic resonance stylus 2 is positioned above the loop coil $LCx_3$, the amplitude of the induced current $Rx_3$ is larger than the amplitudes of the other induced currents Rx, and the induced current $Rx_3$ reflects the changes in the amplitude of the electromotive force PE. The position detecting device 3 is configured to acquire the data transmitted by the electromagnetic resonance stylus 2 by demodulating the induced current $Rx_3$ those amplitude is larger.

The processing circuit 23 is configured to detect an alternating current generated in the resonant circuit, and performs a process of detecting the timing for the position detecting device 3 to start newly transmitting the alternating magnetic field AM on the basis of the result of the detection of the alternating current. Then, the processing circuit 23 carries out on/off control on the switch element SW on the basis of the detected timing. In this manner, it is possible to transmit data from the electromagnetic resonance stylus 2 to the sensor controller 31 while they are in synchronism, as described above.

With the position detecting system 1 according to the present embodiment, as described above, when the switch element SW is off (i.e., in a state where the resonant circuit exists), the position detecting device 3 detects induced currents Rx, and when the switch element SW is on (i.e., in a state where no resonant circuit exists), the position detecting device 3 does not detect induced currents Rx. Therefore, performing on/off control on the switch element SW on the basis of data to be transmitted to the position detecting device 3 is equivalent to performing on/off keying modulation on an induced current Rx, i.e., the stylus signal PS. Consequently, with the position detecting system 1 according to the present embodiment, it is possible to transmit data from the electromagnetic resonance stylus 2 to the position detecting device 3 while the position detecting device 3 is energizing the loop coils LCy.

With the position detecting system 1 according to the present embodiment, furthermore, the sensor controller 31 is configured to intermittently develop the alternating magnetic field AM, and the processing circuit 23 is configured to perform on/off keying modulation on the stylus signal PS on the basis of the timing for the position detecting device 3 to start to newly develop the alternating magnetic field AM. Consequently, it is possible to transmit data from the electromagnetic resonance stylus 2 to the sensor controller 31 while they are in synchronism.

Moreover, the position detecting system 1 according to the present embodiment is also advantageous in that the S/N ratio of the stylus signal PS is higher than a case in which data is transmitted by frequency control of reflected signals. This advantage will be described below with reference to FIG. 6.

Figure 6:
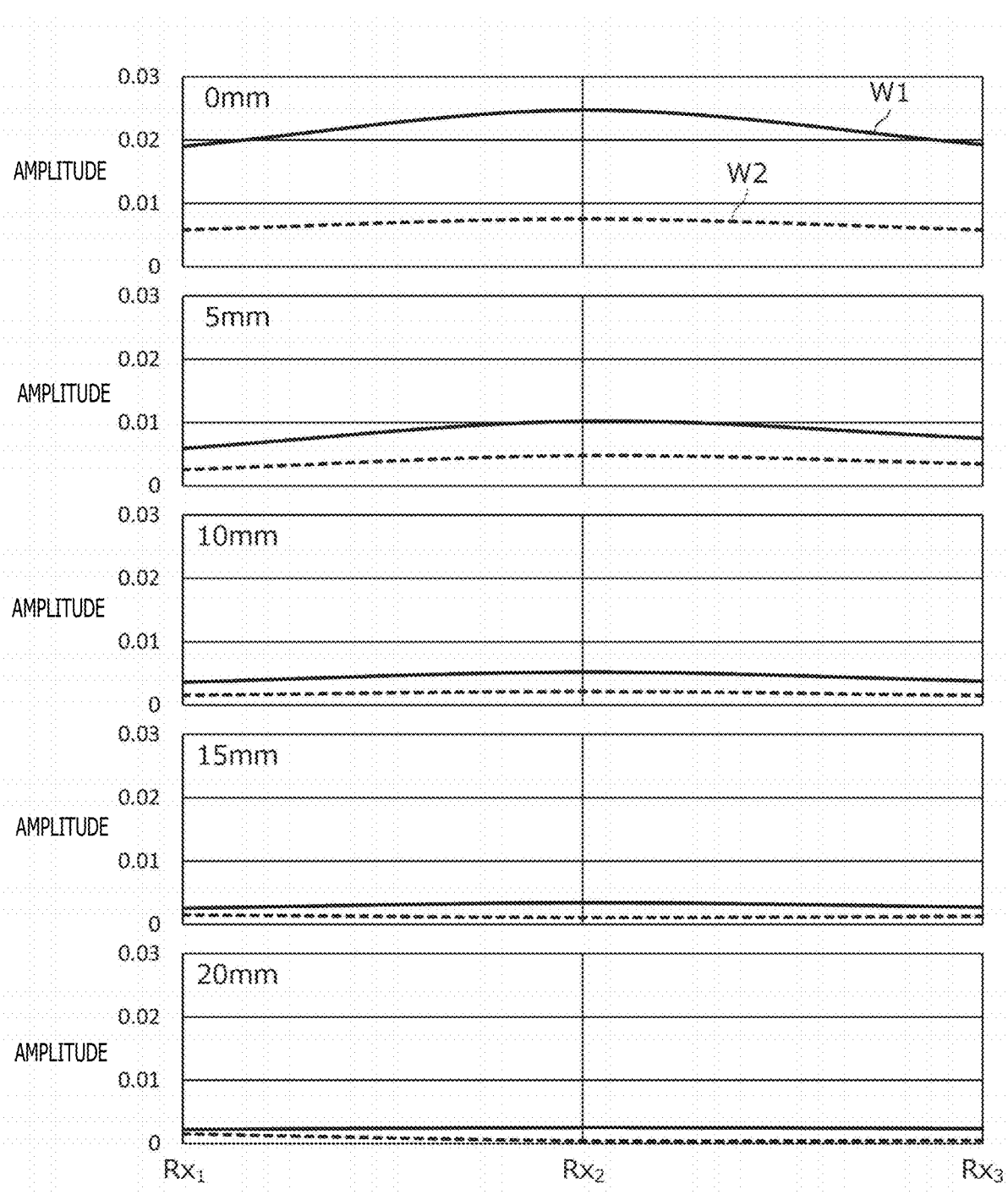
FIG. 6 is a diagram illustrating results of a simulation of amplitudes of induced currents $Rx_1$ to $Rx_3$ observed respectively in loop coils $LCx_1$ to $LCx_3$ in a case in which a coil L is positioned above a loop coil $LCx_2$.

FIG. 6 is a diagram illustrating results of a simulation of amplitudes of induced currents $Rx_1$ to $Rx_3$ observed respectively in loop coils $LCx_1$ to $LCx_3$ in a case in which the coil L is positioned above the loop coil $LCx_2$. In FIG. 6, an amplitude W1 represents the amplitudes of the induced currents $Rx_1$ to $Rx_3$ that have been on-off keyed according to the present embodiment (average values of the amplitudes observed when the switch element SW is off), and an amplitude W2 represents the amplitudes of the induced currents $Rx_1$ to $Rx_3$ that have been modulated according to a comparative example in which data are transmitted by the frequency control of reflected signals (average values of the amplitudes observed after the position detecting device 3 has stopped supplying drive currents Tx until the electromagnetic resonance stylus 2 finishes the transmission of data by the frequency control of reflected signals). FIG. 5 also illustrates respective amplitudes W1 and W2 at the time when the distance between the stylus tip of the electromagnetic resonance stylus 2 and the touch surface is 0 mm, 5 mm, 10 mm, 15 mm, and 20 mm.

As illustrated in FIG. 6, the amplitudes W1 are notably larger than the amplitudes W2 irrespective of the distance between the stylus tip of the electromagnetic resonance stylus 2 and the touch surface. This is because while the position detecting device 3 is energizing the loop coils LCy, the electric power for maintaining the amplitudes of the induced currents Rx is constantly supplied from the sensor controller 31, but after the position detecting device 3 has stopped energizing the loop coils LCy, the electric power for maintaining the amplitudes of the induced currents Rx is provided solely by the electric power stored in the capacitor C. As the remaining charged energy in the capacitor C is gradually reduced, the amplitudes of the induced currents Rx are gradually attenuated.

With the position detecting system 1 according to the present embodiment, as described above, since the electromagnetic resonance stylus 2 is configured to transmit the stylus signal PS while the position detecting device 3 is energizing the loop coils LCy, the electromagnetic resonance stylus 2 is able to transmit the stylus signal PS with larger amplitudes than a case in which the electromagnetic resonance stylus 2 is configured to transmit data by the frequency control of reflected signals. Consequently, it is possible to make the S/N ratio of the stylus signal PS higher than the case in which the electromagnetic resonance stylus 2 is configured to transmit data by the frequency control of reflected signals.

A position detecting system 1 according to a second embodiment of the present disclosure will be described below. The position detecting system 1 according to the present embodiment is different from the position detecting system 1 according to the first embodiment in that the sensor controller 31 performs differential detection of induced currents Rx. Inasmuch as the position detecting system 1 according to the present embodiment is similar to the position detecting system 1 according to the first embodiment as to other details, the position detecting system 1 according to the present embodiment will be described below by focusing on the difference from the position detecting system 1 according to the first embodiment.

Figure 7:
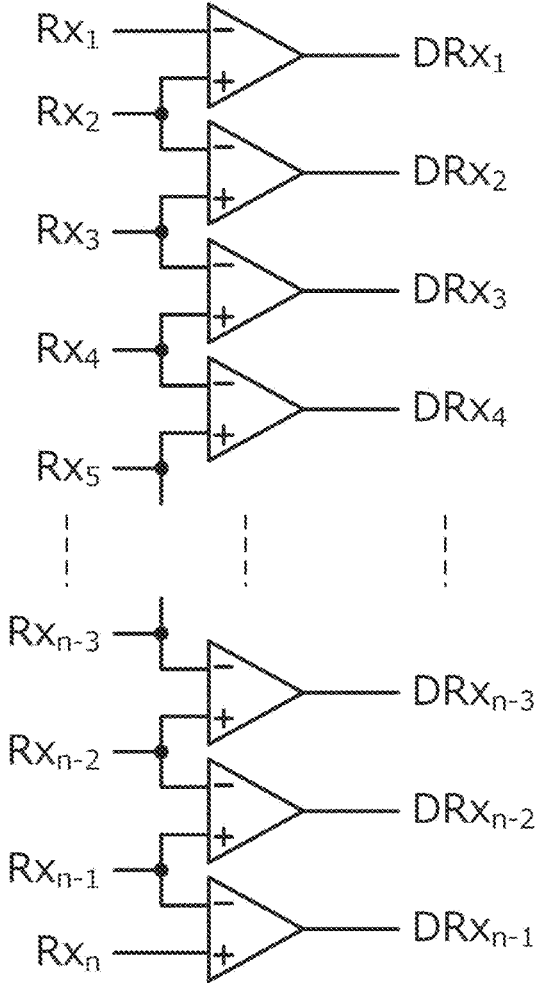
FIG. 7 is a diagram illustrating differential detection performed by a sensor controller 31 according to a second embodiment of the present disclosure.

FIG. 7 is a diagram illustrating differential detection performed by a sensor controller 31 according to the present embodiment. As illustrated in FIG. 7, the sensor controller 31 according to the present embodiment is configured to derive the position of the electromagnetic resonance stylus 2 and demodulate the stylus signal PS using the differences between the levels of the induced currents Rx from adjacent two ones of loop coils LCx. Specifically, the sensor controller 31 derives a difference $DRx_k$ between an induced current $Rx_k$ detected in a loop coil $LCx_k$ (k is an integer ranging from 1 to n−1, n the total number of loop coils LCx) and an induced current $Rx_{k+1}$ detected in a loop coil $LCx_{k+1}$, and detects the position of the electromagnetic resonance stylus 2 and demodulates the stylus signal PS using the differences $DRx_1$ through $DRx_{n-1}$ as the stylus signal PS.

The process described above makes it possible to reduce the adverse effect of the base noise referred to above. This feature will be described in detail below.

Figure 8:
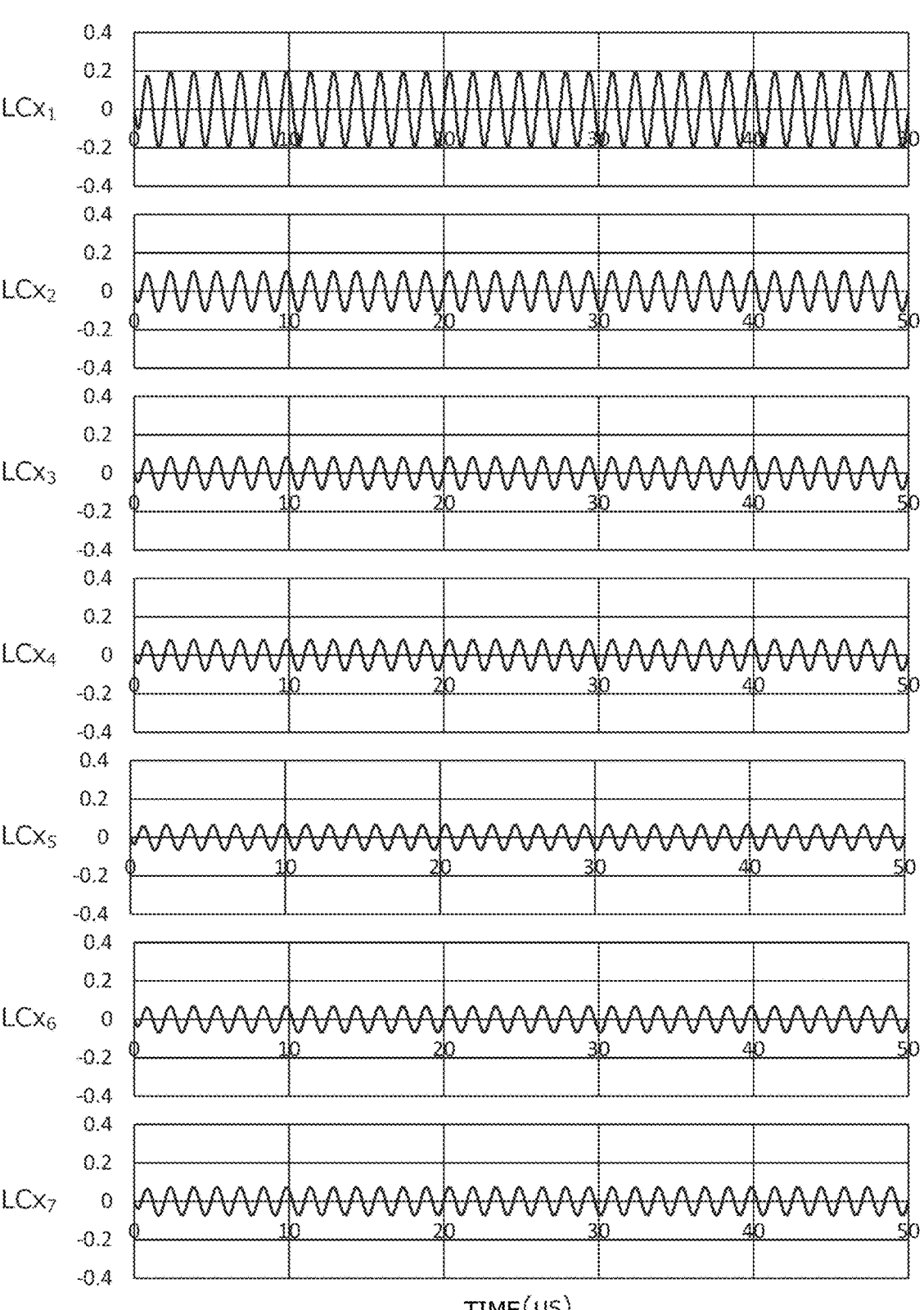
FIG. 8 is a diagram illustrating results of a simulation of the waveforms of base noise observed respectively in loop coils $LCx_1$ to $LCx_7$ that are located in first through seventh positions from an end in an x direction among a plurality of loop coils LCx of a position detecting device 3.

FIG. 8 is a diagram illustrating the results of a simulation of the waveforms of base noise observed respectively in loop coils $LCx_1$ to $LCx_7$ that are located in first through seventh positions from an end in an x direction among a plurality of loop coils LCx of a position detecting device 3. As illustrated in FIG. 8, since the phases of base noise observed in the respective loop coils LCx are equal to each other, the base noise can be canceled out by deriving the differences between the induced currents Rx. Therefore, the process described above that is performed by the sensor controller 31 makes it possible to reduce the adverse effect of the base noise.

Figure 9:
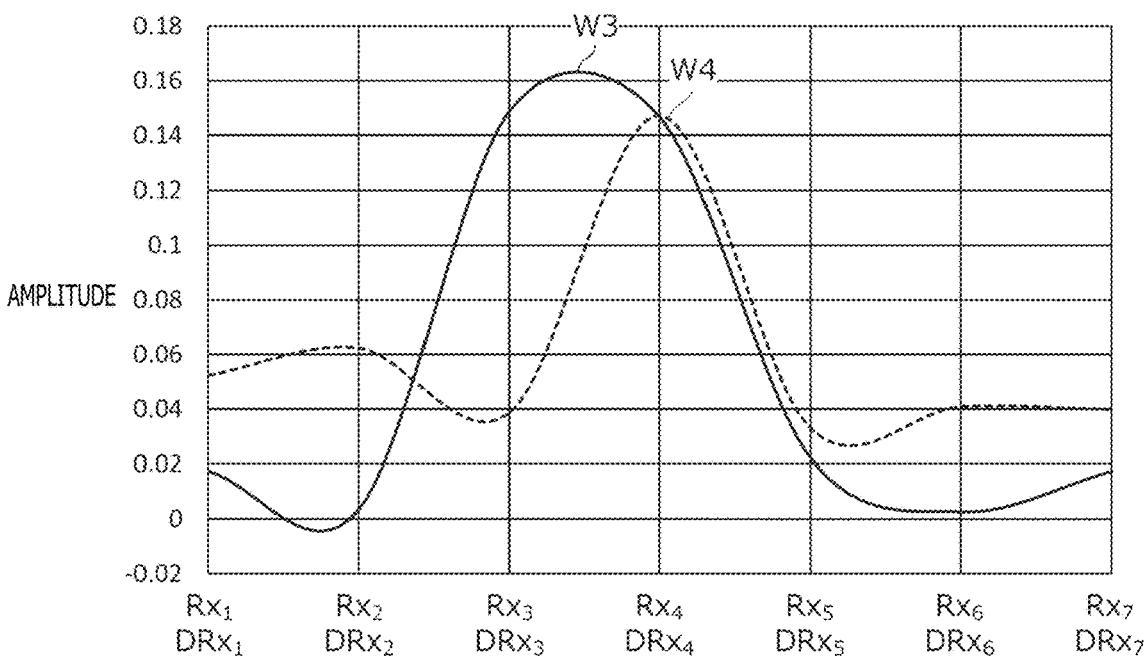
FIG. 9 is a diagram illustrating results of a simulation of distributions in the x direction of respective amplitudes of induced currents $Rx_1$ to $Rx_7$ and differences $DRx_1$ to $DRx_7$ obtained in a case in which the coil L of the electromagnetic resonance stylus 2 is positioned above the loop coil $LCx_4$.

FIG. 9 is a diagram illustrating results of a simulation of distributions in the x direction of respective amplitudes of induced currents $Rx_1$ to $Rx_7$ and differences $DRx_1$ to $DRx_7$ obtained in a case in which the coil L of the electromagnetic resonance stylus 2 is positioned above the loop coil $LCx_4$. The distribution W3 illustrated in FIG. 9 refers to a distribution of the amplitudes of the differences $DRx_1$ to $DRx_7$, and the distribution W4 refers to a distribution of the amplitudes of the induced currents $Rx_1$ to $Rx_7$. The position of the peak of the distribution W3 is shifted from the position of the peak of the distribution W4 by half of a loop coil LCx because the induced currents $Rx_k$ and the differences $DRx_K$ are indicated at the same positions on the horizontal axis of FIG. 9. The sensor controller 31 according to the present embodiment is configured to derive the position of the electromagnetic resonance stylus 2 while correcting such a phase shift.

As can be understood from FIG. 9, the distribution W4 is larger than the distribution W3 except for the peak. This means that the process performed by the sensor controller 31 according to the present embodiment is effective to cancel out the base noise. It can also be understood from the results illustrated in FIG. 9 that the process performed by the sensor controller 31 according to the present embodiment is effective to increase the peak value of the distribution.

With the position detecting system 1 according to present embodiment, as described above, because the sensor controller 31 is configured to derive the position of the electromagnetic resonance stylus 2 and demodulate the stylus signal PS using the differences between the levels of the induced currents Rx from adjacent two ones of loop coils LCx, it is possible to reduce the adverse effects of the base noise on the derivation of the position of the electromagnetic resonance stylus 2 and the demodulation of the stylus signal PS. The position detecting system 1 according to the present embodiment also makes it possible to increase the peak value of the distribution of the amplitudes of the stylus signal PS.

A position detecting system 1 according to a third embodiment of the present disclosure will be described below. The position detecting system 1 according to the present embodiment is different from the position detecting system 1 according to the second embodiment in that the sensor controller 31 performs differential detection of induced currents Rx only with regard to loop coils LCx positioned at ends in the x direction. Inasmuch as the position detecting system 1 according to the present embodiment is similar to the position detecting system 1 according to the second embodiment as to other details, the position detecting system 1 according to the present embodiment will be described below by focusing on the difference from the position detecting system 1 according to the second embodiment.

Figure 10:
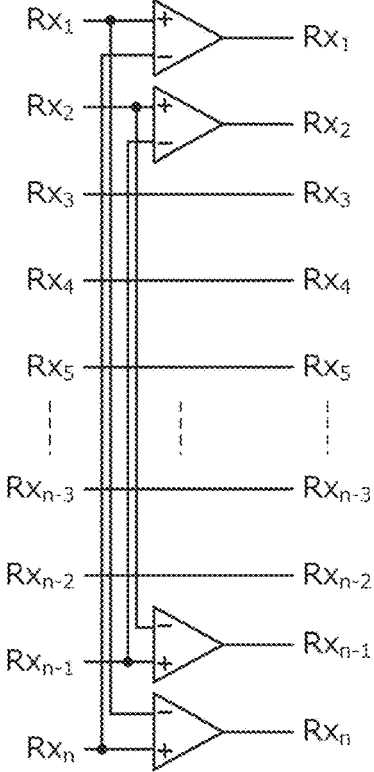
FIG. 10 is a diagram illustrating differential detection performed by a sensor controller 31 according to a third embodiment of the present disclosure.

FIG. 10 is a diagram illustrating differential detection performed by a sensor controller 31 according to a third embodiment of the present disclosure. As illustrated in FIG. 10, the sensor controller 31 according to the present embodiment performs differential detection only on loop coils $LCx_1$ and $LCx_n$ positioned at one end in the x direction and loop coils $LCx_2$ and $LCx_{n-1}$ adjacent thereto. Specifically, the sensor controller 31 derives the position of the electromagnetic resonance stylus 2 and demodulates the stylus signal PS using a current calculated by subtracting an induced current $Rx_n$ from an induced current $Rx_1$ as an induced current $Rx_1$, a current calculated by subtracting an induced current $RX_{n-1}$ from an induced current $Rx_2$ as an induced current $Rx_2$, a current calculated by subtracting the induced current $Rx_2$ from the induced current $Rx_{n-1}$ as an induced current $RX_{n-1}$, and a current calculated by subtracting the induced current $Rx_1$ from the induced current $RX_n$ as an induced current $Rx_n$.

The above process makes it possible to reduce the adverse effects of base noise at both ends in the x direction where the base noise is particularly large. This feature will be described in detail below.

Figure 11:
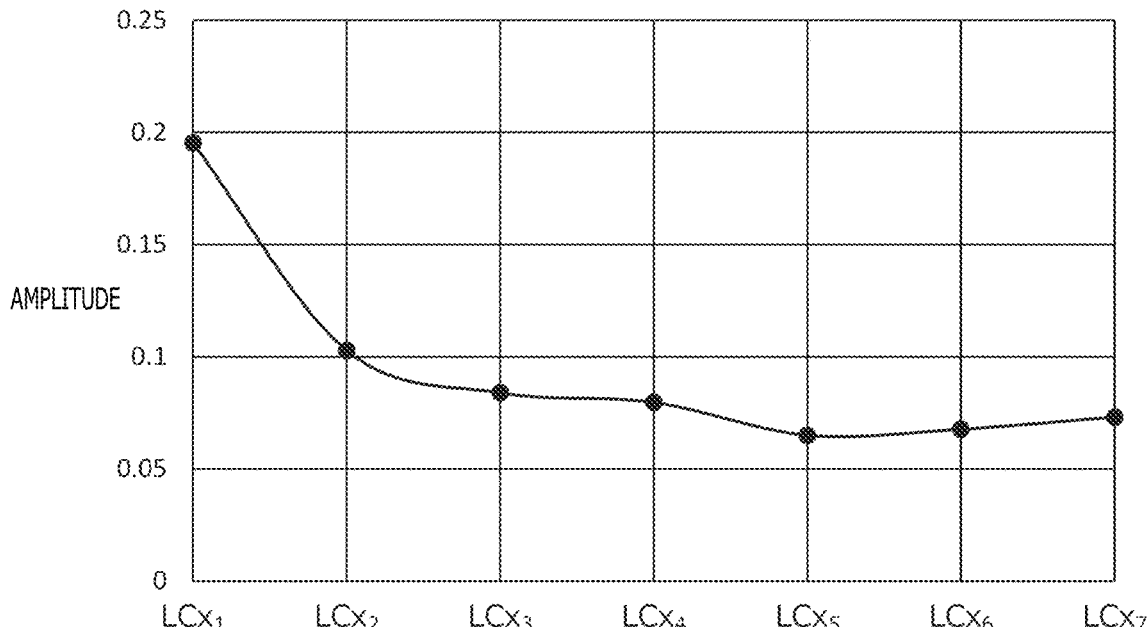
FIG. 11 is a diagram of amplitudes of the base noise illustrated in FIG. 8 that are plotted along a horizontal axis as the x direction.

FIG. 11 is a diagram of the amplitudes of the base noise illustrated in FIG. 8 that are plotted along a horizontal axis as the x direction. As illustrated in FIG. 11, the amplitude of the base noise is large at the loop coils $LCx_1$ and $LCx_2$ near one end in the x direction and small at the other loop coils LCx. It is considered that this is because, as can be seen from FIG. 2, at the end in the x direction, the loop coils LCy include short portions extending in the x direction, and an alternating magnetic field AM generated by those portions is received by the loop coils LCx.

The increased base noise at the end occurs essentially in the same manner at both ends in the x direction. Therefore, it is possible to effectively cancel out the base noise by reducing the induced currents Rx at the ends from each other as described above.

With the position detecting system 1 according to the present embodiment, as described above, as the sensor controller 31 performs differential detection on induced currents Rx at the ends in the x direction. Therefore, it is possible to derive the position of the electromagnetic resonance stylus 2 and reduce the adverse effects of the base noise on the demodulation of the stylus signal PS at the ends in the x direction where the base noise is particularly large.

According to the present embodiment, differential detection is performed on two loop coils LCx at each of the ends in the x direction. However, differential detection may be performed on one loop coil LCx at each of the ends in the x direction or on three or more loop coils LCx at each of the ends in the x direction.

A position detecting system 1 according to a fourth embodiment of the present disclosure will be described below. The position detecting system 1 according to the present embodiment is different from the position detecting system 1 according to the first embodiment in that the specific process of a local scan is different. Inasmuch as the position detecting system 1 according to the present embodiment is similar to the position detecting system 1 according to the first embodiment as to other details, the position detecting system 1 according to the present embodiment will be described below by focusing on the difference from the position detecting system 1 according to the first embodiment.

Figure 12A:
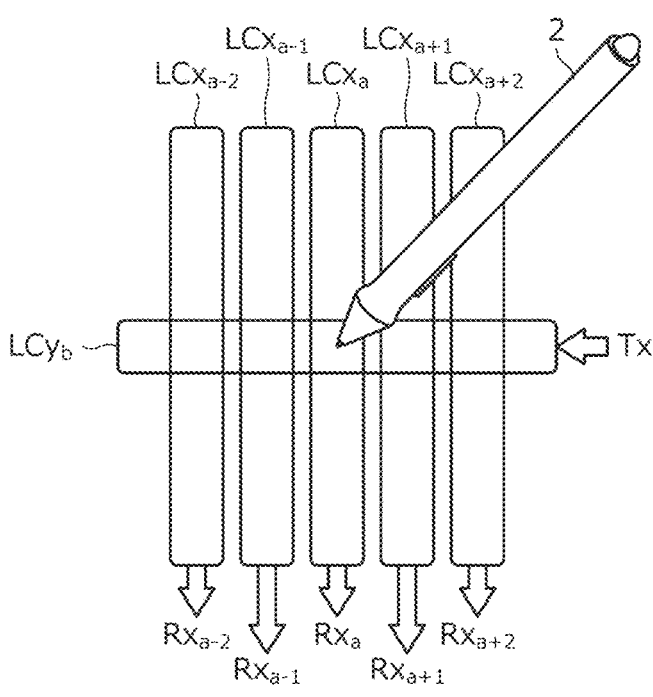
FIGS. 12A and 12B depict diagrams that are explanatory of a local scanning process performed by a sensor controller 31 according to a fourth embodiment of the present disclosure.
Figure 12B:
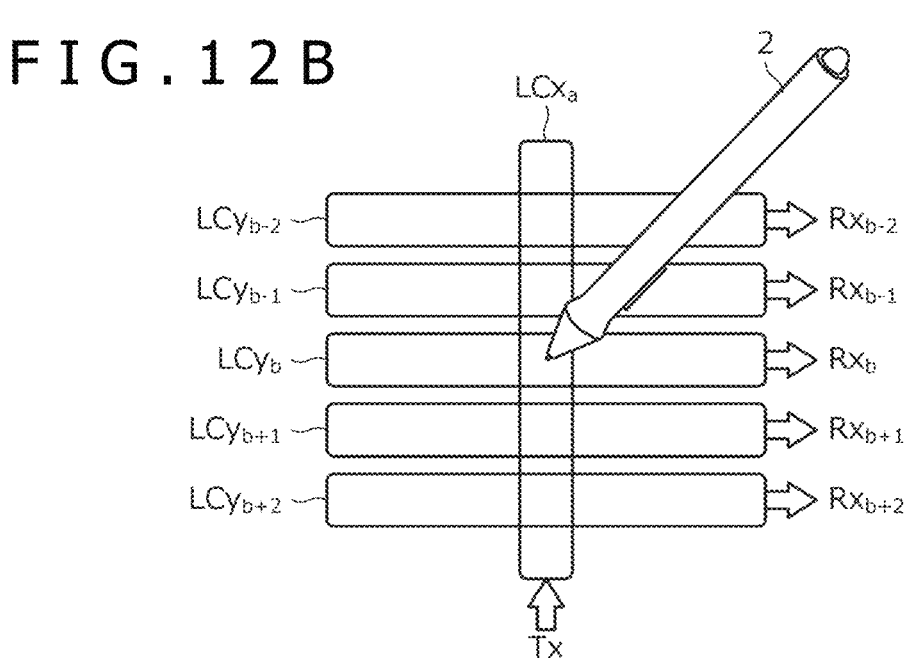

FIGS. 12A and 12B depict diagrams that are explanatory of a local scanning process performed by a sensor controller 31 according to a fourth embodiment of the present disclosure. FIGS. 12A and 12B illustrate a situation in which the latest detected position of an electromagnetic resonance stylus 2 is positioned in the vicinity of a point of intersection of a loop coil $LCx_a$ and a loop coil $LCy_b$. FIGS. 12A and 12B also illustrate the manner in which the sensor controller 31 selects five loop coils LCx and five loop coils LCy (specifically, loop coils $LCx_{a-2}$ through $LCx_{a+2}$ and loop coils $LCy_{b-2}$ through $LCy_{b+2}$) for a local scan. The number of selected loop coils is not limited to 5, but may be larger or smaller than 5.

The sensor controller 31 according to the present embodiment first selects a loop coil LCx and a loop coil LCy in addition to the five loop coils $LCx_{a-2}$ through $LCx_{a+2}$ and the five loop coils $LCy_{b-2}$ through $LCy_{b+2}$ on the basis of the latest detected position. For such selection, the sensor controller 31 is configured to select loop coils $LCx_a$, $LCy_b$ that are closest to the latest detected position. The loop coils $LCx_{a-2}$ through $LCx_{a+2}$ and the loop coils $LCy_{b-2}$ through $LCy_{b+2}$ also selected for the local scan according to the first embodiment may be referred to as "reception loop coils" hereinbelow, whereas the loop coils $LCx_a$ and $LCx_b$ that are selected as closest to the latest detected position may be referred to as "transmission loop coils" hereinbelow.

Then, the sensor controller 31 supplies the loop coil $LCy_b$ selected as a transmission loop coil with a drive current Tx, as illustrated in FIG. 12A, and while supplying the loop coil $LCy_b$ with the drive current Tx, detects induced currents Rx respectively in the five loop coils $LCx_{a-2}$ through $LCx_{a+2}$ selected as reception loop coils. Then, the sensor controller 31 derives the position of the electromagnetic resonance stylus 2 in the x direction on the basis of the distribution (distribution in the x direction) of the levels of the five induced currents $Rx_{a-2}$ through $Rx_{a+2}$ (stylus signal PS) thus obtained.

Then, the sensor controller 31 supplies the loop coil $LCx_a$ selected as a transmission loop coil with a drive current Tx, as illustrated in FIG. 12B, and while supplying the loop coil $LCx_a$ with the drive current Tx, detects induced currents Rx respectively in the five loop coils $LCy_{b-2}$ through $LCy_{b+2}$ selected as reception loop coils. Then, the sensor controller 31 derives the position of the electromagnetic resonance stylus 2 in the y direction on the basis of the distribution (distribution in the y direction) of the levels of the five induced currents $Rx_{b-2}$ through $Rx_{b+2}$ (stylus signal PS) thus obtained.

When the sensor controller 31 performs the local scan according to the above process, the time required for one local scan is shortened compared with the first embodiment. Specifically, for deriving a position using five loop coils LCx and five loop coils LCy in the examples illustrated in FIGS. 12A and 12B, for example, drive currents Tx are supplied five times in the local scan according to the first embodiment, but drive currents Tx are supplied only twice in the local scan according to the present embodiment. Therefore, the time required for one local scan is shortened.

As described above, the position detecting system 1 according to the present embodiment makes it possible to shorten the time required for one local scan.

The preferred embodiments of the present disclosure have been described above. The present disclosure, however, is not limited to those embodiments, and may be reduced to practice in various forms without departing from the scope of the disclosure.

DESCRIPTION OF REFERENCE SYMBOLS

1: Position detecting system
2: Electromagnetic resonance stylus
3: Position detecting device
20: Core
21: Pressure sensor
22: Side switch
23: Processing circuit
30: Switching unit
31: Sensor controller
32 Host processor
AM: Alternating magnetic field
C: Capacitor
L: Coil
LC, LCx, LCy: Loop coil
PE: Electromotive force
PS: Stylus signal
Rx: Induced current
SW: Switch element
Tx: Drive current
The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position detecting device comprising:
a plurality of first loop coils arrayed in a first direction;
a plurality of second loop coils arrayed in a second direction perpendicular to the first direction; and
a sensor controller which, in operation, detects induced currents respectively in the second loop coils while energizing one of the first loop coils,
wherein the sensor controller, in operation, derives a position of an electromagnetic resonance stylus in at least the second direction based on a distribution of levels of the induced currents detected and acquires data transmitted by the electromagnetic resonance stylus by performing on-off keying modulation on the induced currents detected, and
wherein the sensor controller, in operation, derives the position of the electromagnetic resonance stylus and acquires the data transmitted by the electromagnetic resonance stylus,
using a current calculated by subtracting, from one of the induced currents detected in one of the second loop coils that is positioned at a first end in the second direction among the second loop coils, one of the induced currents detected in one of the second loop coils that is positioned at a second end in the second direction among the second loop coils, as the one of the induced currents detected in the one of the second loop coils that is positioned at the first end in the second direction among the second loop coils, and
using a current calculated by subtracting the one of the induced currents detected in the one of the second loop coils that is positioned at the first end in the second direction among the second loop coils from the one of the induced currents detected in the one of the second loop coils that is positioned at the second end in the second direction among the second loop coils, as the one of the induced currents detected in the one of the second loop coils that is positioned at the second end in the second direction among the second loop coils.

2. The position detecting device according to claim 1, wherein the sensor controller, in operation, performs demodulation on the induced currents based on a timing to start energizing the one of the first loop coils.

3. The position detecting device according to claim 1, wherein the sensor controller, in operation, performs:
a global scan for detecting the electromagnetic resonance stylus that is undetected, and
a local scan for detecting the electromagnetic resonance stylus that has been detected,
wherein the global scan includes a process of supplying one of the first loop coils with a drive current and detecting the induced currents respectively in the second loop coils, successively with respect to each of the first loop coils, and deriving the position of the electromagnetic resonance stylus in each of the first direction and the second direction based on a distribution in a touch surface of the levels of the induced currents detected, and wherein the local scan includes a process of:

selecting a predetermined number of the first loop coils and a predetermined number of the second loop coils as reception loop coils and one of the first loop coils and one of the second loop coils as transmission coils based on the position of the electromagnetic resonance stylus detected, detecting the induced currents respectively in the predetermined number of the second loop coils selected as the reception loop coils while supplying one of the first loop coils selected as a transmission loop coil with the drive current, and deriving the position of the electromagnetic resonance stylus in the second direction based on the distribution in the second direction of the levels of the induced currents detected, and detecting the induced currents respectively in the predetermined number of the first loop coils selected as the reception loop coils while supplying one of the second loop coils selected as a transmission loop coil with the drive current, and deriving the position of the electromagnetic resonance stylus in the first direction based on the distribution in the first direction of the levels of the induced currents detected.

4. The position detecting device according to claim 1, wherein the sensor controller, in operation, derives the position of the electromagnetic resonance stylus and acquires the data transmitted by the electromagnetic resonance stylus using differences between the induced currents detected respectively in two adjacent ones of the second loop coils.

5. An electromagnetic resonance stylus comprising:

a resonant circuit including a coil and a capacitor;

a switch element connected parallel to the capacitor; and a processing circuit which, in operation, transmits data to a position detecting circuit by performing on/off control on the switch element according to the data to be transmitted to the position detecting circuit, wherein the processing circuit, in operation:

detects an alternating current generated in the resonant circuit by an alternating magnetic field intermittently transmitted by the position detecting circuit, and detects a timing for the position detecting device to newly transmit the alternating magnetic field based on a result of the detection of the alternating current, and performs the on/off control on the switch element based on the timing detected, wherein the position detecting circuit is coupled to a plurality of first loop coils arrayed in a first direction and a plurality of second loop coils arrayed in a second direction perpendicular to the first direction, and wherein the position detecting circuit, in operation:

derives the position of the electromagnetic resonance stylus and acquires the data transmitted by the electromagnetic resonance stylus, using a current calculated by subtracting, from one of a plurality of induced currents detected in one of the second loop coils that is positioned at a first end in the second direction among the second loop coils, one of the induced currents detected in one of the second loop coils that is positioned at a second end in the second direction among the second loop coils, as the one of the induced currents detected in the one of the second loop coils that is positioned at the first end in the second direction among the second loop coils, and using a current calculated by subtracting the one of the induced currents detected in the one of the second loop coils that is positioned at the first end in the second direction among the second loop coils from the one of the induced currents detected in the one of the second loop coils that is positioned at the second end in the second direction among the second loop coils, as the one of the induced currents detected in the one of the second loop coils that is positioned at the second end in the second direction among the second loop coils.

6. A position detecting system comprising:

an electromagnetic resonance stylus; and a position detecting device, wherein the electromagnetic resonance stylus includes:

a resonant circuit including a coil and a capacitor, a switch element connected parallel to the capacitor, and a processing circuit which, in operation, transmits data to the position detecting circuit by performing on/off control on the switch element according to the data to be transmitted to the position detecting circuit, wherein the position detecting device includes:

a plurality of first loop coils arrayed in a first direction, a plurality of second loop coils arrayed in a second direction perpendicular to the first direction, and a sensor controller which, in operation, detects induced currents respectively in the second loop coils while energizing one of the first loop coils, and wherein the sensor controller, in operation, derives a position of the electromagnetic resonance stylus in at least the second direction based on a distribution of levels of the induced currents detected and acquires data transmitted by the electromagnetic resonance stylus by performing on-off keying modulation on the induced currents detected, and wherein the sensor controller, in operation, derives the position of the electromagnetic resonance stylus and acquires the data transmitted by the electromagnetic resonance stylus, using a current calculated by subtracting, from one of the induced currents detected in one of the second loop coils that is positioned at a first end in the second direction among the second loop coils, one of the induced currents detected in one of the second loop coils that is positioned at a second end in the second direction among the second loop coils, as the one of the induced currents detected in the one of the second loop coils that is positioned at the first end in the second direction among the second loop coils, and using a current calculated by subtracting the one of the induced currents detected in the one of the second loop coils that is positioned at the first end in the second direction among the second loop coils from the one of the induced currents detected in the one of the second loop coils that is positioned at the second end in the second direction among the second loop coils, as the one of the induced currents detected in the one of the second loop coils that is positioned at the second end in the second direction among the second loop coils.

* * * * *